United States Patent Office 3,154,541
Patented Oct. 27, 1964

3,154,541
METHOD FOR PREPARING 6β-19-OXIDO-STEROIDS
Stefan Antoni Szpilfogel, Oss, Netherlands, assignor to Organon Inc., West Orange, N.J., a corporation of New Jersey
No Drawing. Filed June 18, 1962, Ser. No. 202,987
Claims priority, application Netherlands, June 29, 1961, 266,527
7 Claims. (Cl. 260—239.55)

The invention relates to a process for the preparation of 6β,19-oxido-steroids by treatment of a 6β-hydroxy-10-methyl-steroid with an oxidative metal acylate.

The method applied so far for the preparation of 19-nor-steroids consists in that the androstane compounds obtained in the oxidative degradation of, for example, sapogenins or sterols are converted into $\Delta^{1,4}$-3-keto-androstadienes, which are aromatized by heating at a very high temperature to obtain $\Delta^{1,3,5(10)}$-3-hydroxy - oestratriene compounds, which are converted into $\Delta^4$-3-keto-19-nor-steroids by the reduction method of Birch modified by Wilds and Nelson. This synthesis comprises many reaction steps and is very expensive.

As the group of 19-nor-steroids comprises substances that are therapeutically very valuable, it is as a matter of course of great importance to find cheaper and more efficient syntheses.

In the now pre-published Netherlands patent applications Nos. 264,647 and 265,634 new processes are described for the preparation of 19-nor-steroids consisting in that 6β,19-oxido-steroids are converted by means of, for example, zinc and acetic acid or copper/zinc and methanol into 19-hydroxy-steroids, which are subsequently converted into 19-nor-steroids by oxidation and treatment with a strong base.

The 6β,19-oxido-steroids to be used as starting product in these processes are prepared by treating 6β-hydroxy-10-methyl-steroids with a metal acylate, for example lead tetra-acetate as described by A. Bowers et al. in Chemistry and Industry, page 1299 (1960). By this known method a 6β-hydroxy-steroid is refluxed for 18 hours with lead tetra-acetate in benzene to obtain the desired 6β,19-oxido-compound in a yield of 68%.

Surprisingly it has been found now that the reaction time in the relative preparation of the oxido compounds is considerably reduced and the yield of the desired 6,19-oxido-steriod considerably raised if the reaction is performed in the presence of iodine and under the influence of a radical initiator.

As radical-initiator an azo-compound or a peroxide is preferably applied. To the first-mentioned group belong the compounds having the following grouping:

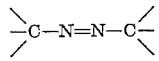

An important active group of azo-compounds is one having a cyano group coupled to each of the two carbon atoms next to the nitrogen atoms. These compounds have the general formula:

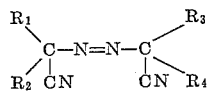

$R_1$ and $R_2$ represent hydrogen, or $R_1$, $R_2$, $R_3$ and $R_4$ the same or different alkyl- or aralkyl-groups, or $R_1$ and $R_2$ and/or $R_3$ and $R_4$ together form a cyclo-alkyl group.

As examples of these compounds are mentioned α,α'-azo-di-benzylpropionitrile, α,α' - azo - di - cyclohexanonitrile, α,α'-azo-di-isobutyronitrile and α,α'-azo-dimethyl-butyronitrile. For preference the α,α'-azo-diisobutyronitrile is used.

As radical-initiator can also be used a peroxide, such as diacetylperoxide, benzoylperoxide, dibenzoylperoxide and di-p-bromobenzoylperoxide.

The radical-initiator need only be added to the reaction medium in small quantities. Usually 0.001–0.2 mol of initiator is added per mol of steroid.

The quantity of iodine to be added to the reaction mixture usually amounts to ½–5 mol per mol of steroid. Very good results were already obtained with only ½ mol of $I_2$ to 1 mol of steroid.

The process according to the invention can be performed by reacting the relative steroid for a certain period of time at a raised temperature in the presence of an oxidative metal acylate, a suitable organic solvent, iodine and a radical-initiator.

The reaction period depends upon the reaction temperature, which latter depends again on the solvent used. If the reaction is performed at the boiling point of the solvent, the reaction time usually amounts to 1–4 hours.

As oxidative metal acylates are mentioned lead tetra-acylates, such as lead tetra-acetate and lead tetra-propionate, silver acylates and mercury acylates.

For preference lead tetra-acetate is used.

As organic solvent is preferably used a cyclic hydrocarbon, such as cyclohexane and dimethyl cyclohexane, an aromatic hydrocarbon, such as benzene and toluene, or petroleum ether. Furthermore halogenated hydrocarbons, such as chloroform and carbon tetrachloride, may be used.

It has proved to be favourable also to add a weak base, such as calcium carbonate, to the reaction mixture is order to neutralize the acids that are formed during the reaction.

Generally 6β-hydroxy-steroids, such as those of the androstane, pregnane, cholane, cholestane and spirostane series, can be used as starting products in the present process.

Important starting products are the 6β-hydroxy-steroids saturated in ring a of the allo or normal series, possibly substituted at carbon atom 5 by a halogen atom.

The yield of the process according to the invention amounts to at least 90%.

The invention is further illustrated by the following examples.

Example I

A suspension of 1.6 g. of calcium carbonate and 4.2 g. of lead tetra-acetate in 300 ml. of cyclohexane is heated to 80° C., whereupon 0.5 g. iodine is added. Next the mixture is refluxed in the dark for 30 minutes while stirring.

Next 2.5 g. of 3β,6β,17β-trihydroxy-5α-bromo-androstane-3-acetate-17-benzoate and 0.125 g. of α,α'-azo-di-isobutyronitrile are added. Thereupon the reaction mixture is refluxed for three hours while stirring, after which the mixture is filtered, the residue washed with ether and the filtrate washed successively with a 10% sodium bisulfite solution and a dilute sodium bicarbonate solution and finally with water. The washed filtrate is dried on sodium sulphate and then evaporated in vacuo to dryness. The residue (2.85 g.) is treated with activated charcoal in methylene chloride and then crystallised from a mixture of methylene chloride and methanol to obtain 2.28 g. of 3β - acetoxy - 17β-benzoxy-5α-bromo-6β,19-oxido-androstane with the melting point of 247–251° C. and $[\alpha]_D = +32°$.

Example II

A suspension of 104 g. of lead tetra-acetate, 12.6 g. of iodine and 40 g. of calcium carbonate in 7500 ml. of cyclohexane is refluxed for thirty minutes, after which 75 g. of 3β - acetoxy-5α-bromo-6β-hydroxy-17-keto-androstane and 3.5 g. of α,α'-azo-di-benzylpropionitril are added. Next the mixture is refluxed for 3½ hours and worked up in the manner described in Example I to obtain 67.3 g. of 3β-acetoxy-5α-bromo-6β,19-oxido-17-keto-androstane with the melting point of 175–177° C. and $[\alpha]_D = +40°, 5$ (chloroform).

*Example III*

By the process described in Example I a mixture of 3β-acetoxy-5α-bromo-6β-hydroxy-20-keto-pregnane in petroleum ether has been converted into the corresponding 3β-acetoxy - 5α - bromo - 6β,19 - oxido-20-keto-pregnane by means of lead tetra-acetate in the presence of iodine and benzoyl peroxide.

In the same manner the 3β-17β-diacetoxy-5α-bromo-6β-hydroxy-androstane has been converted into the 3β, 17β - diacetoxy - 5α - bromo-6β,19-oxido-androstane by means of lead tetra-acetate with benzene as solvent and α,α'-azo-di-cyclohexanonitrile as radical-initiator. Melting point 174–175° C.; yield 91%.

*Example IV*

A suspension of 2 g. of lead tetra-acetate and 0.9 g. of calcium carbonate in 160 ml. of benzene is heated to 80° C., whereupon 0.35 g. of iodine is added. Next the mixture is refluxed in the dark for 30 minutes while stirring, whereupon 1.15 g. of 3β,6β,17β-trihydroxy-androstane-3, 17-diacetate and 0.085 g. of α,α'-azo-di-isobutyronitrile are added. Next the mixture is refluxed for 3½ hours and subsequently processed as described in Example I to obtain 3β,17β, - diacetoxy-6β,19-oxido-androstane in a yield of 92%.

*Example V*

In accordance with the process described in Example I a mixture of 3β,6β-dihydroxy-5α-chloro-17-keto-androstane in petroleum ether (60–80° C.) is converted into the 3β - hydroxy - 5α-chloro-6β,19-oxido-17-keto-androstane—melting point 228–230° C.—by means of lead tetra-acetate in the presence of diacylperoxide and iodine.

I claim:

1. Process for the preparation of a 6β,19-oxido-steroid comprising reacting a 6β-hydroxy-10-methylsteroid selected from the group consisting of the androstane and pregnane series with an oxidative metal acylate selected from the group consisting of a lead tetra-acylate, a silver acylate, and a mercury acylate, in the presence of iodine, and a radical-initiator selected from the group consisting of an azo compound of the formula:

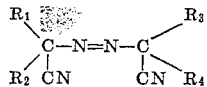

wherein $R_1$ and $R_2$ are selected from the group consisting of hydrogen, an alkyl and aralkyl group, and $R_3$ and $R_4$ are selected from the group consisting of an alkyl and aralkyl group, and an acyl peroxide.

2. Process for the preparation of a 6β,19-oxido-steroid comprising reacting a 6β-hydroxy-10-methylsteroid selected from the group consisting of the androstane and pregnane series with a lead tetra-acylate in the presence of an organic solvent, iodine, and a radical-initiator selected from the group consisting of an azo compound of the formula:

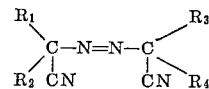

wherein $R_1$ and $R_2$ are selected from the group consisting of hydrogen, an alkyl and aralkyl group, and $R_3$ and $R_4$ are selected from the group consisting of an alkyl and aralkyl group, and an acyl peroxide.

3. Process according to claim 1, in which the radical-initiator is an azo compound of the formula:

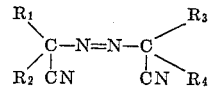

wherein $R_1$ and $R_2$ are selected from the group consisting of hydrogen, an alkyl and aralkyl group, and $R_3$ and $R_4$ are selected from the group consisting of an alkyl and aralkyl group.

4. Process according to claim 3, in which the azo compound α,α'-azo-diisobutyronitrile is used.

5. Process according to claim 1, in which the peroxide is diacetylperoxide.

6. Process according to claim 1, in which a weak base is added to the reaction medium.

7. Process according to claim 1, in which the peroxide is benzoyl peroxide.

References Cited in the file of this patent

UNITED STATES PATENTS 3,067,198    Wettstein et al. _____ Dec. 4, 1962

OTHER REFERENCES

Mills et al.: "Chemistry and Industry" (1961), page 946.